March 17, 1959 — H. C. PAULSEN — 2,877,763
CEMENT HANDLING APPARATUS
Filed July 31, 1956

Inventor
Hans C. Paulsen
By his Attorney

United States Patent Office 2,877,763
Patented Mar. 17, 1959

2,877,763

CEMENT HANDLING APPARATUS

Hans C. Paulsen, Lexington, Mass., assignor to United Shoe Machinery Corporation, Flemington, N. J., a corporation of New Jersey Application July 31, 1956, Serial No. 601,167

4 Claims. (Cl. 126—343.5)

This invention relates to apparatus for handling rod cement and is particularly concerned with improvements in apparatus of this type in which the rod cement is fed along and is at the same time melted by means of a rotating disk or disklike member journaled within a heated casing, for example of the type disclosed and claimed in United States Letters Patent No. 2,765,768 granted October 9, 1956, in my name.

In use of apparatus of the above-mentioned type it has been found that the melting and feeding disk has a definite tendency to draw the solid cement along through the passage formed between the disk and the casing as the cement is progressively melted so that the disk or disklike member actually has what may be termed a "pumping action" for delivering adhesive to an outlet or outlet recess formed in the casing. It is the principal object of this invention to provide a novel and improved cement handling apparatus of the aforementioned type wherein the pumping action of the rotatable disklike melting and feeding member is augmented and in which a more positive delivery of the molten adhesive to the outlet casing is effected. To this end, the herein illustrated apparatus has a heated casing in which there is journaled a rotary disklike melting and feeding member which is provided on its periphery with a series of gear teeth. This melting and feeding member is received within a generally circular recess formed in the casing and its peripheral teeth are in mesh with a pinion also journaled in the casing and received within the circular portion of an outlet recess in the casing which is in communication with the recess containing the melting and feeding member and also with an outlet passage formed in the casing. The casing has an inlet passage leading into the recess in which the melting and feeding member is received. This recess is so shaped as to provide a melting passageway between its outer wall and the periphery of the melting and feeding member, which passageway extends from the inlet around to the outlet recess. Preferably, and as herein illustrated, the shape of the generally circular recess is such that the melting passage is of gradually decreasing radial width as it approaches the other recess.

With this novel arrangement, the solid rod of cement as it is fed into the inlet passage is engaged by the teeth on the periphery of the melting and feeding member, which, as it rotates, feeds the cement along the melting passage. As the cement is thus fed along in this passage it is melted so that molten cement is delivered to the outlet recess in which the aforementioned pinion is received. Inasmuch as the meshing teeth of the melting and feeding member and the mentioned pinion present a barrier through which little, if any, molten cement can pass, these two members function like a gear pump and force molten adhesive into the outlet recess and from this recess out through the outlet in the casing. As disclosed in a modified form, this gear pump action may be augmented by providing a second pinion meshing with the first pinion within the outlet recess. In addition to the above-mentioned gear pump action, the pumping action of the melting and feeding member is greatly increased by the provision of the gear teeth on its periphery and these teeth also serve to mix and stir the molten cement as it travels along the melting passageway, and particularly as it approaches that portion of passageway which is of decreased radial width adjacent to the outlet recess.

The above and other objects and features of the invention will appear in the following detailed description of the preferred embodiment which is illustrated in the accompanying drawings and will be pointed out in the claims.

Figure 1:
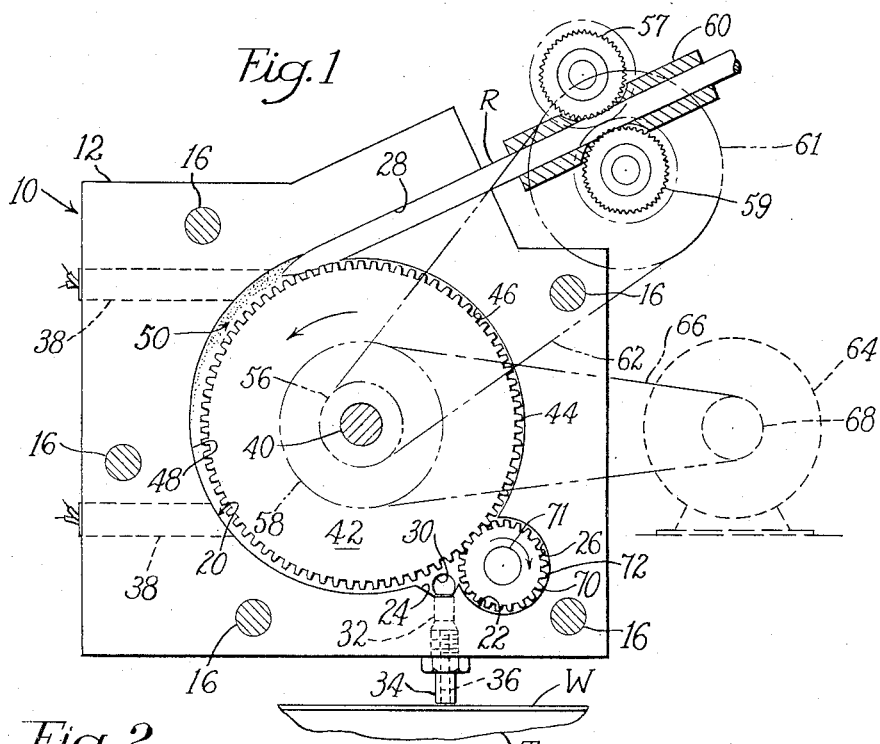
Fig. 1 is a view in vertical section substantially on line I—I of Fig. 2 and looking in the direction of the arrows, of cement handling apparatus embodying the features of this invention.
Figure 2:
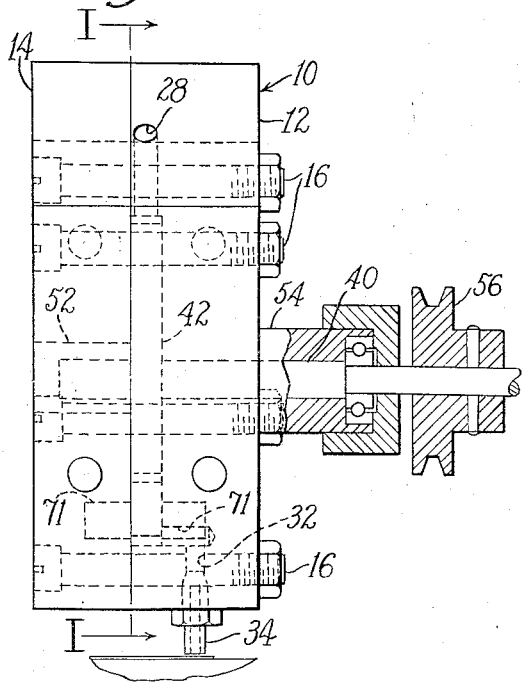
Fig. 2 is a view in end elevation of the apparatus shown in Fig. 1 as seen from the right-hand side.

Referring to these drawings, the apparatus which is therein illustrated comprises a casing, indicated generally by the reference character 10, and formed of a main body portion 12 and a cover part 14 which are secured together in face-to-face relation by means of bolts 16, 16, Fig. 2. The body portion 12 is formed with a generally circular recess 20 and an adjacent outlet recess 22 having an angularly disposed wall 24 and a circular wall 26, Fig. 1. Leading into and tangentially intersecting the recess 20 is an inlet passage 28, while leading out of the outlet recess 22 is an outlet passage having a lateral portion 30 and a downwardly extending portion 32 in the latter of which there is threaded a nozzle 34 having a discharge passage 36 therein. For heating the casing 10 a number of electrical heating units 38, 38 are inserted therein, and these units are connected to a suitably controlled source of electrical energy, not shown.

Journaled in the casing 10 on a shaft 40, and received within the recess 20, is a rotary melting and feeding member 42 which is provided on its periphery with a series of gear teeth 44. As is shown in Fig. 1 of the drawings, a portion 46 of the wall of the recess 20 is concentric with and spaced closely to the periphery of the member 42, while the remaining portion 48 of this wall is spirally shaped so that a melting and feeding passageway 50 of decreasing radial width, from the inlet 28 around to the outlet recess 22, is provided. The shaft 40 is journaled at one end in a bushing 52, pressed into the cover portion 14 of the casing 10, while the other end of this shaft is journaled in and projects outwardly beyond a bearing boss 54, formed integrally with the body portion 12 of the casing 10, and this shaft carries two pulleys 56, 58, one of which appears in Fig. 2 of the drawings. Mounted adjacent to the casing 10 in any suitable manner and in alinement with the inlet passage 28 is a guide bushing 60 with which there are associated two feed wheels 57, 59 arranged to be driven from the pulley 56 by means of a pulley 61 and a belt 62, as diagrammatically illustrated in Fig. 1. Also, as diagrammatically illustrated in Fig. 1, the other pulley 58 on the shaft 40 is adapted to be driven from a motor 64 by means of a belt 66 and pulley 68.

Referring to Fig. 1, a pinion 70, which nicely fits within the circular portion 26 of the recess 22, is rotatably mounted in the casing by means of a stub shaft 71, and this pinion has teeth 72 which are in mesh with the teeth 44 of the melting and feeding member 42.

In use, when a solid rod R of cement is fed into the inlet passage 28, its leading end will be engaged by the teeth 44 on the periphery of the melting and feeding member 42 and this member will feed the cement along through the passageway 50 toward the outlet recess 22 and outlet passage 30. During this feeding of the cement it is heated and melted so that the cement is delivered in liquid form to the recess 22. Inasmuch as the intermeshing teeth 44 and 72 of the melting and feeding member 42 and the pinion 70 present a barrier to the passage of molten cement and inasmuch as any small amount of cement which passes this barrier is returned to the recess 22, directly by the pinion 70 or indirectly through recess 20 and passage 50 by the melting and feeding member 42, these two members, in effect, function somewhat like a gear pump for forcing molten adhesive into the outlet recess 22 and thence outwardly from this recess through passages 30, 32 to the nozzle 34. As will be apparent, the provision of the teeth 44 on the melting and feeding member 42 greatly augments its pumping action, i. e., its tendency to draw the cement along through the passage 50, and also enhances its action to stir and to mix the molten cement within the passageway 50, especially as the molten cement is squeezed and worked through the narrowing portion of this passageway as it approaches the outlet recess 24.

As is shown in Fig. 1 of the drawings, the nozzle 34 may be used directly to apply cement to a work piece W as it is moved relatively to the nozzle on a support or table T. Obviously, if desired, the nozzle, or any other cement applying device, may be located more remotely from the cement handling device and connected to the outlet passage 32 by means of a suitable conduit.

Figure 3:
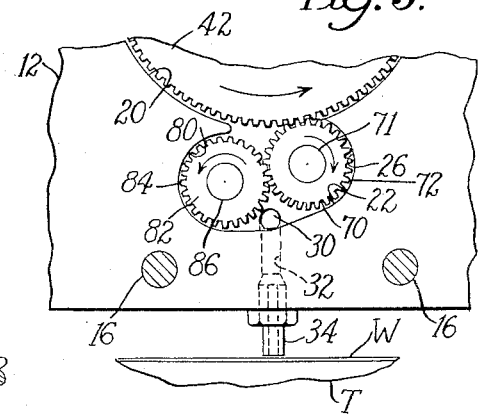
Fig. 3 is a view of a portion of a modified apparatus.

Referring to Fig. 3, in the modification therein illustrated, the recess 22 is enlarged by the addition of another portion having a circular wall 80 in which there is received a second pinion 82 having teeth 84 in mesh with the teeth 72 of the pinion 70, the pinion 82 being rotatably mounted in the casing 10 by means of a stub shaft 86. With this modified arrangement, the pinion 82 acts as a pump to carry molten cement delivered to the upper portion of the recess 22 around to the lower portion of this recess, and in this way provides a somewhat more forceful delivery of the molten cement from the outlet recess to the nozzle 34 through the outlet passages 30, 32.

Having thus described my invention, what I claim as new and desire to secure by Letters Patent of the United States is:

1. A cement handling apparatus comprising a heated casing provided with a first recess and having an inlet tangentially intersecting the recess and an outlet, a rotary member mounted in said recess for feeding and melting solid cement introduced into the recess through said inlet and for feeding the molten cement to said outlet, said recess being so shaped as to provide a passageway leading around the periphery of said melting and feeding member from said inlet to said outlet, said rotary melting and feeding member having a series of gear teeth on its periphery for augmenting its feeding action on the molten cement in said passageway, a second recess in said casing opening into said first recess and in communication with said outlet, and a rotary member mounted in said second recess and having on its periphery a series of gear teeth in mesh with the teeth on said melting and feeding member.

2. A cement handling aparatus comprising a heated casing provided with a first recess and having an inlet tangentially intersecting the recess and an outlet, a rotary member mounted in said recess for feeding and melting solid cement introduced into the recess through said inlet and for feeding the molten cement to said outlet, said recess being so shaped as to provide a passageway leading around the periphery of said melting and feeding member of gradually decreasing radial width from said inlet to said outlet, said rotary melting and feeding member having a series of gear teeth on its periphery for augmenting its feeding action on the molten cement in said passageway, a second recess in said casing opening into said first recess and in communication with said outlet, and a rotary member mounted in said second recess and having on its periphery a series of gear teeth in mesh with the teeth on said melting and feeding member.

3. A cement handling apparatus comprising a heated casing provided with a first recess and having an inlet tangentially intersecting the recess and an outlet, a rotary member mounted in said recess for feeding and melting solid cement introduced into the recess through said inlet and for feeding the molten cement to said outlet, said recess being so shaped as to provide a passageway leading around the periphery of said melting and feeding member from said inlet to said outlet, said rotary melting and feeding member having a series of gear teeth on its periphery for augmenting its feeding action on the molten cement in said passageway, a second recess in said casing opening into said first recess and in communication with said outlet, and a pair of rotary members mounted in said second recess, said pair of rotary members having intermeshing gear teeth and the teeth on one of said members being in mesh with the teeth on said melting and feeding disk.

4. A cement handling apparatus comprising a heated casing provided with a first recess and having an inlet tangentially intersecting the recess and an outlet, a rotary member mounted in said recess for feeding and melting solid cement introduced into the recess through said inlet and for feeding the molten cement to said outlet, said recess being so shaped as to provide a passageway leading around the periphery of said melting and feeding member of gradually decreasing radial width from said inlet to said outlet, said rotary melting and feeding member having a series of gear teeth on its periphery for augmenting its feeding action on the molten cement in said passageway, a second recess in said casing opening into said first recess and in communication with said outlet, and a pair of rotary members mounted in said second recess, said pair of rotary members having intermeshing gear teeth and the teeth of one of said members being in mesh with the teeth on said melting and feeding member.

References Cited in the file of this patent

UNITED STATES PATENTS

| | | |
|---|---|---|
| 20,796 | Holly | July 6, 1858 |
| 2,531,861 | Schmitt | Nov. 28, 1950 |
| 2,708,278 | Kamborian | May 17, 1955 |
| 2,726,629 | Paulsen | Dec. 13, 1955 |
| 2,765,768 | Paulsen | Oct. 9, 1956 |

FOREIGN PATENTS

| | | |
|---|---|---|
| 156,902 | Australia | Sept. 7, 1951 |